US012591190B2

(12) United States Patent
Isawa et al.

(10) Patent No.: US 12,591,190 B2
(45) Date of Patent: Mar. 31, 2026

(54) IMAGE FORMING APPARATUS CONFIGURED TO APPLY A TRANSFER BIAS TO A TRANSFER NIP BASED ON A PLURALITY OF TRANSFER CONDITIONS, IMAGE FORMING METHOD, AND RECORDING MEDIUM

(71) Applicants: Takayuki Isawa, Kanagawa (JP); Daisuke Takahashi, Kanagawa (JP); Shinichi Akatsu, Kanagawa (JP); Akio Kosuge, Kanagawa (JP); Atsushi Nagata, Kanagawa (JP); Shinya Tanaka, Kanagawa (JP)

(72) Inventors: Takayuki Isawa, Kanagawa (JP); Daisuke Takahashi, Kanagawa (JP); Shinichi Akatsu, Kanagawa (JP); Akio Kosuge, Kanagawa (JP); Atsushi Nagata, Kanagawa (JP); Shinya Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/888,724

(22) Filed: Sep. 18, 2024

(65) Prior Publication Data

US 2025/0181013 A1 Jun. 5, 2025

(51) Int. Cl.

| | |
|---|---|
| ***G03G 15/16*** | (2006.01) |
| ***G03G 15/00*** | (2006.01) |
| ***G03G 15/01*** | (2006.01) |

(52) U.S. Cl.

CPC ..... *G03G 15/1675* (2013.01); *G03G 15/0131* (2013.01); *G03G 15/0189* (2013.01);

(Continued)

(58) Field of Classification Search

USPC .......................................................... 399/66

See application file for complete search history.

(56) References Cited

U.S. PATENT DOCUMENTS

2012/0315058 A1* 12/2012 Shimizu ............ G03G 15/1645 399/66

2013/0004190 A1 1/2013 Sengoku et al.

(Continued)

FOREIGN PATENT DOCUMENTS

| | | |
|---|---|---|
| JP | 2013-033205 A | 2/2013 |
| JP | 2018-120104 A | 8/2018 |

*Primary Examiner* — Quana Grainger

(74) *Attorney, Agent, or Firm* — Harness, Dickey & Pierce, P.L.C.

(57) ABSTRACT

An image forming apparatus includes: an image bearer, a transfer member disposed opposite the image bearer to form a transfer nip between the transfer member and the image bearer; a power supply device to apply a transfer bias; and processing circuitry to generate a plurality of transfer conditions for the transfer bias, the transfer conditions being different from each other and including a combination of values of at least a direct current (DC) component out of the DC component and an alternating current (AC) component, and switch the transfer conditions to apply the transfer bias from the power supply device to the transfer nip. The circuitry transfers an image from the image bearer to a recording material for each one of the transfer conditions according to an adjustment mode that is set among a plurality of adjustment modes for adjusting a transfer bias corresponding to the recording material.

10 Claims, 10 Drawing Sheets

(52) U.S. Cl.
CPC ..... *G03G 15/5004* (2013.01); *G03G 15/5016* (2013.01); *G03G 15/80* (2013.01)

(56) References Cited

U.S. PATENT DOCUMENTS

| | | | |
|---|---|---|---|
| 2016/0112580 | A1 | 4/2016 | Muto et al. |
| 2016/0246220 | A1 | 8/2016 | Sone et al. |
| 2019/0163108 | A1 | 5/2019 | Sakurada et al. |
| 2020/0103806 | A1 | 4/2020 | Akatsu |
| 2021/0041800 | A1 | 2/2021 | Kosuge et al. |

* cited by examiner

FIG. 5

SECONDARY TRANSFER BIAS TABLE

| RECORDING SHEET | ITEM | SECONDARY TRANSFER BIAS |
|---|---|---|
| PLAIN PAPER SHEET | MONOCHROME FRONT SURFACE | DC BIAS (DC CURRENT VALUE A) |
| | MONOCHROME BACK SURFACE | DC BIAS (DC CURRENT VALUE B) |
| | FULL-COLOR FRONT SURFACE | DC BIAS (DC CURRENT VALUE C) |
| | FULL-COLOR BACK SURFACE | DC BIAS (DC CURRENT VALUE D) |
| UNEVEN PAPER SHEET | MONOCHROME FRONT SURFACE | SUPERIMPOSED BIAS (DC CURRENT VALUE E/AC VOLTAGE VALUE $\alpha$) |
| | MONOCHROME BACK SURFACE | SUPERIMPOSED BIAS (DC CURRENT VALUE F/AC VOLTAGE VALUE $\beta$) |
| | FULL-COLOR FRONT SURFACE | SUPERIMPOSED BIAS (DC CURRENT VALUE G/AC VOLTAGE VALUE $\gamma$) |
| | FULL-COLOR BACK SURFACE | SUPERIMPOSED BIAS (DC CURRENT VALUE H/AC VOLTAGE VALUE $\delta$) |

FIG. 6A

| SECONDARY TRANSFER CONDITION (SUPERIMPOSED BIAS) | | AC VOLTAGE (Vpp) [kV] | | | | |
|---|---|---|---|---|---|---|
| | | def−2 | def−1 | def | def+1 | def+2 |
| DC CURRENT [μA] | def−10 | (1) | (2) | (3) | (4) | (5) |
| | def | (6) | (7) | (8)(REFERENCE) | (9) | (10) |
| | def+10 | (11) | (12) | (13) | (14) | (15) |

FIG. 6B

| SECONDARY TRANSFER CONDITION (DC BIAS) | def−2 | def−1 | def | def+1 | def+2 | def+3 | def+4 | def+5 | def+6 |
|---|---|---|---|---|---|---|---|---|---|
| DC CURRENT [μA] | (16) | (17) | (18) (REFERENCE) | (19) | (20) | (21) | (22) | (23) | (24) |

IMAGE FORMING APPARATUS CONFIGURED TO APPLY A TRANSFER BIAS TO A TRANSFER NIP BASED ON A PLURALITY OF TRANSFER CONDITIONS, IMAGE FORMING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2023-203431, filed on Nov. 30, 2023, in the Japan Patent Office, the entire disclosure of which is hereby incorporated by reference herein.

BACKGROUND

Technical Field

The present disclosure relates to an image forming apparatus, an image forming method, and a recording medium.

Related Art

In an electrophotographic image forming apparatus, a toner image is electrostatically transferred from a photoconductor, an intermediate transfer body, and an image bearer to a recording material such as a paper sheet. When the toner image is transferred, a transfer bias is applied to a transfer member such as a transfer roller that comes into contact with the image bearer and transfers the toner image. In order to improve transferability to concaves of an uneven paper sheet and a rough surface sheet, a technique is known of applying a superimposed bias of a direct current (DC) voltage and an alternating current (AC) voltage to a transfer member for secondary transfer. Although it is necessary to set a DC component and an AC component to be applied as the superimposed bias, there is a disadvantage that an optimum superimposed bias is shifted due to factors such as deterioration of a developer, resistance change of each of members, and environment.

As a technique for applying such a superimposed bias, a technique is disclosed in which a control unit is included that, in a test transfer mode, outputs only the DC voltage from a power supply, out of the DC voltage and the AC voltage, to control a superimposed voltage, and a printing speed is increased.

SUMMARY

The present disclosure described herein provides an image forming apparatus that includes an image bearer, a transfer member, a power supply device, and processing circuitry. The image bearer bears a toner image. The transfer member is disposed opposite the image bearer to form a transfer nip between the transfer member and the image bearer. The power supply device applies a transfer bias to the transfer nip. The processing circuitry generates a plurality of transfer conditions for the transfer bias, the plurality of transfer conditions being different from each other and including a combination of values of at least a direct current (DC) component out of the DC component and an alternating current (AC) component, switches the plurality of transfer conditions to apply the transfer bias from the power supply device to the transfer nip, and transfers an image from the image bearer to a recording material for each one of the plurality of transfer conditions according to an adjustment mode that is set among a plurality of adjustment modes for adjusting a transfer bias corresponding to the recording material.

The present disclosure described herein also provides an image forming method. The method includes generating, switching, and transferring. The generating generates a plurality of transfer conditions for a transfer bias to be applied from a power supply device to a transfer nip between an image bearer to bear a toner image and a transfer member, the plurality of transfer conditions being different from each other and including a combination of values of at least a DC component out of the DC component and an AC component. The switching switches the plurality of transfer conditions to apply the transfer bias from the power supply device to the transfer nip. The transferring transfers an image from the image bearer to a recording material for each one of the plurality of transfer conditions to be applied, according to an adjustment mode that is set among a plurality of adjustment modes for adjusting a transfer bias corresponding to the recording material.

The present disclosure described herein also provides a non-transitory recording medium. The recording medium stores program code for causing a computer to execute: generating a plurality of transfer conditions for a transfer bias to be applied from a power supply device to a transfer nip between an image bearer to bear a toner image and a transfer member, the plurality of transfer conditions being different from each other and including a combination of values of at least a DC component out of the DC component and an AC component; switching the plurality of transfer conditions to apply the transfer bias from the power supply device to the transfer nip; and transferring an image from the image bearer to a recording material for each one of the plurality of transfer conditions to be applied, according to an adjustment mode that is set among a plurality of adjustment modes for adjusting a transfer bias corresponding to the recording material.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an example of a secondary transfer bias table of the image forming apparatus according to the embodiment;

FIGS. 6A and 6B are diagrams illustrating examples of secondary transfer conditions of the image forming apparatus according to the embodiment;

Figure 1:
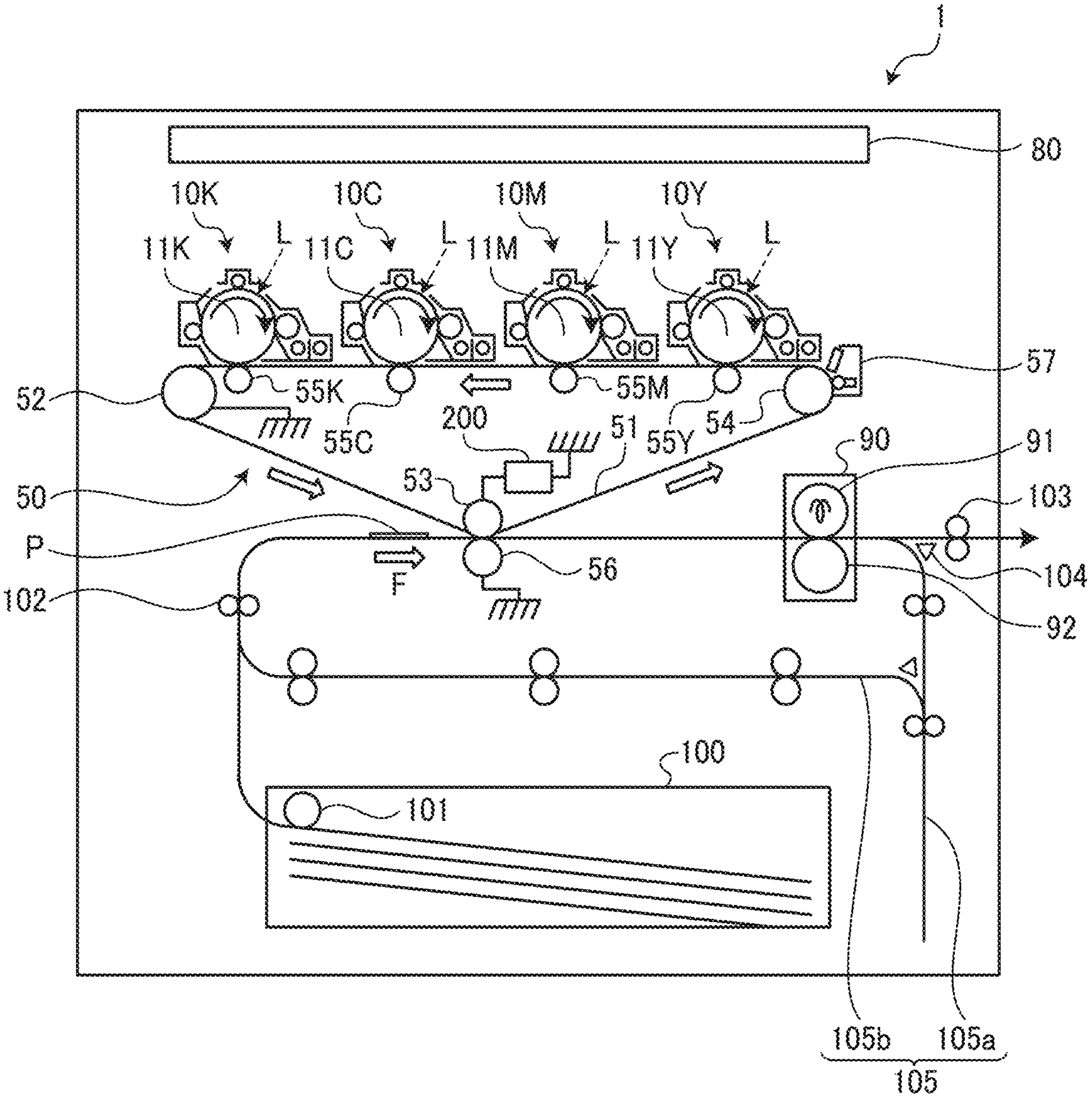
FIG. 1 is a diagram illustrating an example of an overall configuration of an image forming apparatus according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an image forming apparatus, an image forming method, and a program according to the present disclosure will be described in detail with reference to the drawings. The present disclosure, however, is not limited to the following one or more embodiments, and the constituent elements of the following one or more embodiments include elements that may be easily conceived by those skilled in the art, those being substantially the same ones, and those being within equivalent ranges. Various omissions, substitutions, changes, and combinations of constituent elements can be made without departing from the gist of the following embodiments.

Overall Configuration of Image Forming Apparatus

Figure 2:
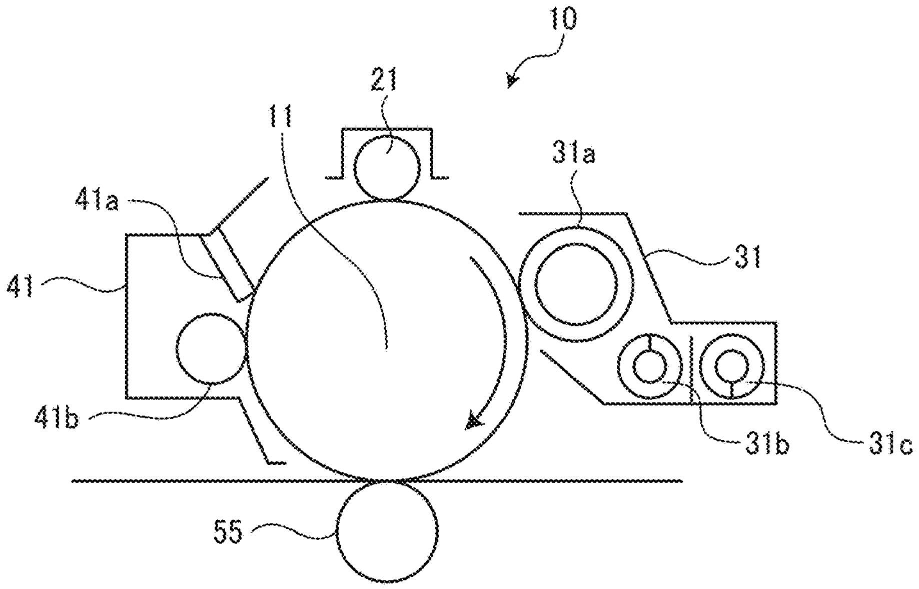
FIG. 2 is a diagram illustrating an example of a configuration of an image forming unit of the image forming apparatus according to the embodiment.

FIG. 1 is a diagram illustrating an example of an overall configuration of an image forming apparatus according to an embodiment. FIG. 2 is a diagram illustrating an example of a configuration of an image forming unit of the image forming apparatus according to the embodiment. With reference to FIGS. 1 and 2, a description will be given of the overall configuration of an image forming apparatus 1 according to the present embodiment.

The image forming apparatus 1 illustrated in FIG. 1 is an electrophotographic image forming apparatus that transfers a toner image developed on the basis of an electrostatic latent image on a photoconductor drum to a recording sheet (recording material). The image forming apparatus 1 includes image forming units 10C, 10K, 10M, and 10Y, an optical writing unit 80, a transfer unit 50, a fixing device 90, a sheet-feeding cassette 100, a registration roller pair 102, a sheet ejection roller pair 103, a switching claw 104, and a reverse re-conveying device 105.

The image forming units 10C, 10K, 10M, and 10Y are units for forming toner images of cyan (C), black (K), magenta (M), and yellow (Y), respectively. For example, the image forming unit 10Y, the image forming unit 10M, the image forming unit 10C, and the image forming unit 10K are arranged in this order from the upstream side along the upper traveling side of an intermediate transfer belt 51 to be described later, and are configured as a tandem image formation unit. Each of the image forming units 10C, 10K, 10M, and 10Y is detachably provided to a main body of the image forming apparatus 1. The image forming units 10C, 10K, 10M, and 10Y include photoconductor drums 11C, 11K, 11M, and 11Y, respectively. Note that, regarding the image forming units 10C, 10K, 10M, and 10Y, in a case where any of the image forming units is indicated or the image forming units are collectively referred to, an "image forming unit 10" is simply used. Further, regarding the photoconductor drums 11C, 11K, 11M, and 11Y, in a case where any of the photoconductor drums is indicated or the photoconductor drums are collectively referred to, a "photoconductor drum 11" is simply used.

As illustrated in FIG. 2, the image forming unit 10 includes the photoconductor drum 11, a charging device 21, a developing device 31, and a cleaning device 41.

The photoconductor drum 11 is a drum-shaped latent image bearer in which an organic photosensitive layer is formed on a surface of a drum base. The photoconductor drum 11 is rotationally driven in a clockwise direction in a sheet view of FIG. 2 by a driving unit.

The charging device 21 is a device that uniformly charges the surface of the photoconductor drum 11 by generating a discharge between a charging roller and the photoconductor drum 11 while bringing the charging roller to which a charging bias is applied into contact with or close to the photoconductor drum 11. For example, the charging device 21 uniformly charges the surface of the photoconductor drum 11 to the negative polarity same as the normal charging polarity of the toner. As the charging bias, a bias is employed in which an AC voltage is superimposed on a DC voltage. Instead of the method using the charging roller, a method using an electrostatic charger may be employed.

The developing device 31 is a device that develops and visualizes a latent image on the photoconductor drum 11 with a developer containing toner. As illustrated in FIG. 2, the developing device 31 includes a developing sleeve 31*a* as a developer bearer and two screw members 31*b* and 31*c* as stirring members for conveying the developer while stirring the developer in a storage container in which two-component developer containing toner and carrier is stored. As the developing device 31, for example, a developing device using a one-component developer containing toner may be employed.

The cleaning device 41 is a device that cleans the surface of the photoconductor drum 11. As illustrated in FIG. 2, the cleaning device 41 includes a cleaning blade 41*a* and a cleaning brush roller 41*b*.

The cleaning blade 41*a* is in contact with the photoconductor drum surface from a counter direction with respect to a rotation direction of the photoconductor drum 11. The cleaning brush roller 41*b* is in contact with the surface of the photoconductor drum 11 while rotating in a direction opposite to the rotation direction of the photoconductor drum 11. The cleaning blade 41*a* and the cleaning brush roller 41*b* clean the surface of the photoconductor drum 11.

The optical writing unit 80 is a unit that is provided on the image forming units 10C, 10K, 10M, and 10Y and writes a latent image on the surface of the photoconductor drum 11 charged by the charging device 21. The optical writing unit 80 optically scans the surfaces of the photoconductor drums 11C, 11K, 11M, and 11Y with laser light emitted from a laser diode on the basis of image data received from an external device such as a personal computer (PC). Specifically, the optical writing unit 80 irradiates the surface of the photoconductor drum 11 with laser light L emitted from a light source via a plurality of optical lenses and mirrors while polarizing the laser light L in a main scanning direction with a polygon mirror rotationally driven by a polygon motor. By the optical scanning by the optical writing unit 80, electrostatic latent images for C, K, M, and Y are formed on the surfaces of the photoconductor drums 11C, 11K, 11M, and 11Y. Specifically, a potential attenuates at a portion irradiated with the laser light from the optical writing unit 80 in the entire region of the uniformly charged surface of the photoconductor drum 11. As a result, the potential of the portion irradiated with the laser light becomes smaller than the potential of other portions (background portion), and as a result, an electrostatic latent image is formed. Note that the optical writing unit 80 may perform optical writing by light emitting diode (LED) light emitted from a plurality of LEDs of an LED array.

The transfer unit 50 is a unit that secondarily transfers the toner image primarily transferred from the photoconductor drum 11 to a recording sheet P by the intermediate transfer belt 51 that is an endless belt member that is an image bearer and an intermediate transfer body. As illustrated in FIG. 1, the transfer unit 50 includes the intermediate transfer belt 51, a driving roller 52, a secondary transfer counter roller 53, a cleaning backup roller 54, primary transfer rollers 55C, 55K, 55M, and 55Y, a secondary transfer roller 56, and a cleaning device 57.

The intermediate transfer belt 51 is a belt member that is stretched by the driving roller 52, the secondary transfer counter roller 53, the cleaning backup roller 54, and the primary transfer rollers 55C, 55K, 55M, and 55Y disposed inside, and moves endlessly counterclockwise in a sheet view of FIG. 1 by rotational driving of the driving roller 52. The intermediate transfer belt 51 secondarily transfers the toner image primarily transferred from the photoconductor drum 11 to the recording sheet P.

The driving roller 52 is a roller that is disposed inside the intermediate transfer belt 51 and moves the intermediate transfer belt 51 endlessly by rotational driving.

The secondary transfer counter roller 53 is a roller that is disposed inside the intermediate transfer belt 51 and sandwiches the intermediate transfer belt 51 with the secondary transfer roller 56 facing the secondary transfer counter roller 53. The secondary transfer counter roller 53 is connected to a secondary-transfer-bias power supply 200, and a secondary transfer bias is applied by the secondary-transfer-bias power supply 200. That is, the secondary transfer bias is applied to a secondary transfer nip to be described later by the secondary-transfer-bias power supply 200. As a result, a secondary transfer electric field for transferring the toner from the secondary transfer counter roller 53 side to the secondary transfer roller 56 side is formed between the secondary transfer counter roller 53 and the secondary transfer roller 56. The secondary transfer bias corresponds to a "transfer bias" of the present embodiment.

The cleaning backup roller 54 is a roller that is disposed inside the intermediate transfer belt 51 and cleans the toner remaining on the intermediate transfer belt 51 after the secondary transfer together with the cleaning device 57.

The primary transfer rollers 55C, 55K, 55M, and 55Y are rollers that sandwich the intermediate transfer belt 51, which moves endlessly, between the photoconductor drums 11C, 11K, 11M, and 11Y, respectively. As a result, primary transfer nips for C, K, M, and Y are formed in which the front surface of the intermediate transfer belt 51 comes into contact with the photoconductor drums 11C, 11K, 11M, and 11Y. Note that, regarding the primary transfer rollers 55C, 55K, 55M, and 55Y, in a case where any primary transfer roller is indicated or the primary transfer rollers are collectively referred to, a "primary transfer roller 55" is simply used.

A primary transfer bias is applied to each of the primary transfer rollers 55C, 55K, 55M, and 55Y by a primary transfer bias power supply. As a result, a transfer electric field is formed between the toner image of each of colors on the photoconductor drums 11C, 11K, 11M, and 11Y and the corresponding primary transfer roller 55, and the toner image is primarily transferred from each photoconductor drum 11 onto the intermediate transfer belt 51 by action of the transfer electric field and nip pressure of the primary transfer nip. Then, the toner image of Y, the toner image of M, the toner image of C, and the toner image of K are sequentially superimposed and primarily transferred on the intermediate transfer belt 51, whereby a color toner image in which four colors are superimposed is formed on the intermediate transfer belt 51. Primary transfer may be performed by using a transfer charger, a transfer brush, or the like instead of the primary transfer roller 55.

Further, in the case of forming a monochrome toner image, a support plate supporting the primary transfer rollers 55Y, 55M, and 55C for Y, M, and C in the transfer unit 50 is moved to move the primary transfer rollers 55Y, 55M, and 55C away from the photoconductor drums 11Y, 11M, and 11C, respectively. As a result, the front surface of the intermediate transfer belt 51 is separated from the photoconductor drums 11Y, 11M, and 11C, and the intermediate transfer belt 51 is brought into contact with only the photoconductor drum 11K. In this state, among the four image forming units 10Y, 10M, 10C, and 10K, only the image forming unit 10K is driven to form the toner image of K (monochrome toner image) on the photoconductor drum 11K.

The secondary transfer roller 56 is a transfer member that is disposed outside the intermediate transfer belt 51 and sandwiches the intermediate transfer belt 51 with the secondary transfer counter roller 53 inside the intermediate transfer belt 51. As a result, the secondary transfer nip is formed in which the front surface of the intermediate transfer belt 51 comes into contact with the secondary transfer roller 56. The secondary transfer roller 56 is electrically grounded. The secondary-transfer-bias power supply 200 may be connected to the secondary transfer roller 56, and the secondary transfer counter roller 53 may be electrically grounded. The secondary transfer nip corresponds to a "transfer nip" of the present embodiment.

The toner image on the intermediate transfer belt 51 brought into close contact with the recording sheet P at the secondary transfer nip is secondarily transferred onto the recording sheet P by action of the secondary transfer electric field and nip pressure of the secondary transfer nip. When the recording sheet P on which a full-color toner image or a monochrome toner image is formed on the front surface in this manner passes through the secondary transfer nip, the recording sheet P is curvature-separated from the secondary transfer roller 56 and the intermediate transfer belt 51.

The cleaning device 57 is a device that cleans the toner remaining on the intermediate transfer belt 51 after the secondary transfer together with the cleaning backup roller 54.

The fixing device 90 is a device that fixes the toner image onto the recording sheet P by heating and pressurizing the recording sheet P onto which the toner image has been secondarily transferred at the secondary transfer nip. As illustrated in FIG. 1, the fixing device 90 includes a fixing roller 91 and a pressure roller 92.

The fixing roller 91 is a roller including a heat source such as a halogen lamp. The pressure roller 92 is a roller that comes into contact with the fixing roller 91 at a predetermined pressure. A fixing nip is formed by the fixing roller 91 and the pressure roller 92.

The recording sheet P fed into the fixing device 90 is sandwiched by the fixing nip in a posture in which a surface on which the unfixed toner image has been secondarily transferred is in close contact with the fixing roller 91. Then, the toner in the toner image is softened by influence of heating and pressurization by the fixing roller 91 and the pressure roller 92, and the toner image is fixed.

The sheet-feeding cassette 100 is a cassette that is disposed below the transfer unit 50 and accommodates a plurality of the recording sheets P as target transfer members in a sheet bundle state. The sheet-feeding cassette 100 includes a sheet-feeding roller 101.

The sheet-feeding roller 101 is a roller that comes into contact with the uppermost recording sheet P of the sheet bundle accommodated in the sheet-feeding cassette 100 and rotates at a predetermined timing to feed the recording sheet P toward the registration roller pair 102 on a sheet-feeding path.

The registration roller pair 102 is a roller pair disposed near the end of the sheet-feeding path for the recording sheet P. The registration roller pair 102 immediately stops the rotation when the recording sheet P fed from the sheet-feeding cassette 100 by the sheet-feeding roller 101 is sandwiched. Then, the registration roller pair 102 resumes rotational driving at a timing at which the sandwiched recording sheet P can be synchronized with the toner image on the intermediate transfer belt 51 in the secondary transfer nip, and feeds the recording sheet P toward the secondary transfer nip.

The sheet ejection roller pair 103 is a roller pair that ejects the recording sheet P, which passes through the fixing device 90 and is conveyed to an ejection path by the switching claw 104, to the outside of the image forming apparatus 1.

The switching claw 104 is a claw member that switches whether to convey the recording sheet P having passed through the fixing device 90 to the ejection path toward the sheet ejection roller pair 103 or a return path toward the reverse re-conveying device 105.

The reverse re-conveying device 105 is a device that reverses and re-feeds the recording sheet P that has passed through the fixing device 90 and been conveyed to the return path when double-sided printing is performed on the recording sheet P. As illustrated in FIG. 1, the reverse re-conveying device 105 includes a switchback section 105*a* and a re-conveying section 105*b*.

The switchback section 105*a* is a part in which the entered recording sheet P is switched back and conveyed to the re-conveying section 105*b*. The re-conveying section 105*b* is a conveyance path for conveying the recording sheet P switched back by the switchback section 105*a* to the sheet-feeding path again.

In the case of single-sided printing, the recording sheet P having passed through the fixing device 90 is guided toward the ejection path by the switching claw 104. As a result, the recording sheet P is ejected to the outside of the image forming apparatus 1 via the sheet ejection roller pair 103.

On the other hand, in the case of double-sided printing, the recording sheet P having passed through the fixing device 90 is guided toward the return path by the switching claw 104. The recording sheet P guided to the return path is conveyed to the switchback section 105*a* of the reverse re-conveying device 105. The recording sheet P having entered the switchback section 105*a* is switched back at the switchback section 105*a*. As a result, the recording sheet P enters the re-conveying section 105*b* while being turned upside down with the rear end facing forward. Then, the recording sheet P is conveyed again from the re-conveying section 105*b* toward the sheet-feeding path. Thereafter, the recording sheet P passes through the registration roller pair 102 and the secondary transfer nip, a toner image is also transferred to the back surface, and then the toner image is fixed in the fixing device 90. Then, the recording sheet P is ejected to the outside of the image forming apparatus 1 via the sheet ejection roller pair 103.

Hardware Configuration of Main Part of Image Forming Apparatus

Figure 3:
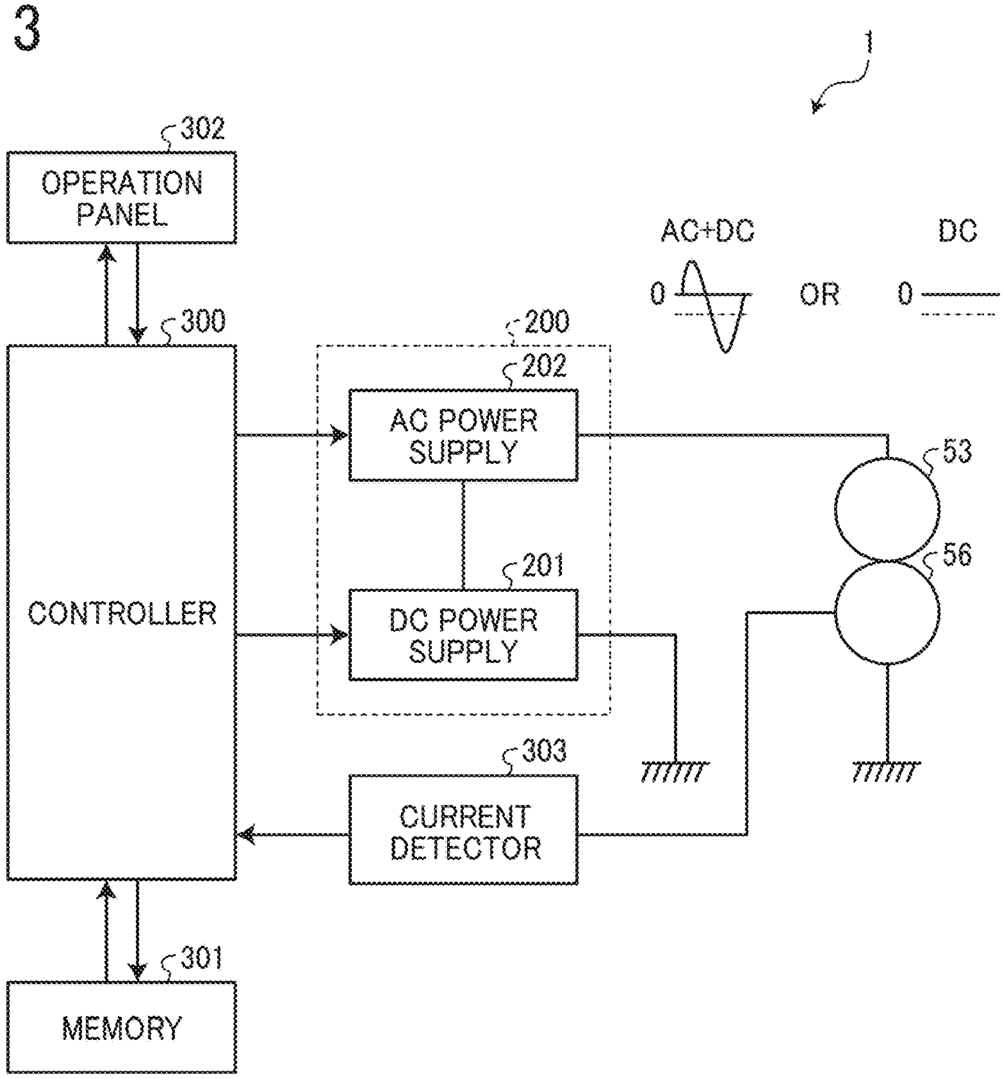
FIG. 3 is a diagram illustrating an example of a hardware configuration of a main part of the image forming apparatus according to the embodiment.

FIG. 3 is a diagram illustrating an example of a hardware configuration of a main part of the image forming apparatus according to the embodiment. With reference to FIG. 3, a description will be given of the hardware configuration of the main part of the image forming apparatus 1 according to the present embodiment.

As illustrated in FIG. 3, the image forming apparatus 1 includes the secondary-transfer-bias power supply 200 (power supply device), a controller 300, a memory 301 (storage device), an operation panel 302 (operation device), and a current detector 303.

The secondary-transfer-bias power supply 200 includes a DC power supply 201 that outputs a DC voltage, and an AC power supply 202 that outputs a voltage obtained by superimposing an AC voltage on the DC voltage output from the DC power supply 201. The secondary-transfer-bias power supply 200 can switch and output application of only a DC component (hereinafter, may be referred to as DC bias) or application of a component (herein after, may be referred to as superimposed bias) obtained by superimposing an AC component on a DC component, as the above-described secondary transfer bias that is a voltage applied to the secondary transfer counter roller 53.

The controller 300 is a controller that controls operation of applying the secondary transfer bias to the secondary transfer counter roller 53 by the secondary-transfer-bias power supply 200. The controller 300 includes, for example, a central processing unit (CPU) that controls the image forming apparatus 1. When applying the superimposed bias to the secondary transfer counter roller 53, the controller 300 outputs a control signal to the DC power supply 201 and the AC power supply 202, and applies the superimposed bias from the AC power supply 202 to the secondary transfer counter roller 53. When applying the DC bias to the secondary transfer counter roller 53, the controller 300 outputs a control signal to the DC power supply 201, and applies the DC bias from the AC power supply 202 to the secondary transfer counter roller 53.

In addition, the controller 300 performs pulse width modulation (PWM) constant voltage control on the AC component output from the AC power supply 202 and performs PWM constant current control on the DC component output from the DC power supply 201, on the basis of a current flowing through the secondary transfer nip detected by the current detector 303. By performing constant current control of the DC component, even if electric resistance of the intermediate transfer belt 51, the secondary transfer roller 56, and the like fluctuates due to a temperature and humidity environment or the like, an applied voltage changes accordingly, so that the transfer electric field at the secondary transfer nip is stabilized, and stable secondary transferability can be obtained.

The memory 301 is a nonvolatile storage device that stores a secondary transfer bias table in which a secondary transfer bias is associated for each of types of the recording sheet to be described later. The memory 301 is connected to the controller 300.

The operation panel 302 is a panel including a button and a touch panel that receive an operation input by a user, and a liquid crystal display device that displays various screens, setting information, and the like. The operation panel 302 is connected to the controller 300.

The current detector 303 is a sensor that detects a current flowing through the secondary transfer nip. The current detector 303 is connected to the controller 300 and outputs a detected current value to the controller 300.

Figure 4:
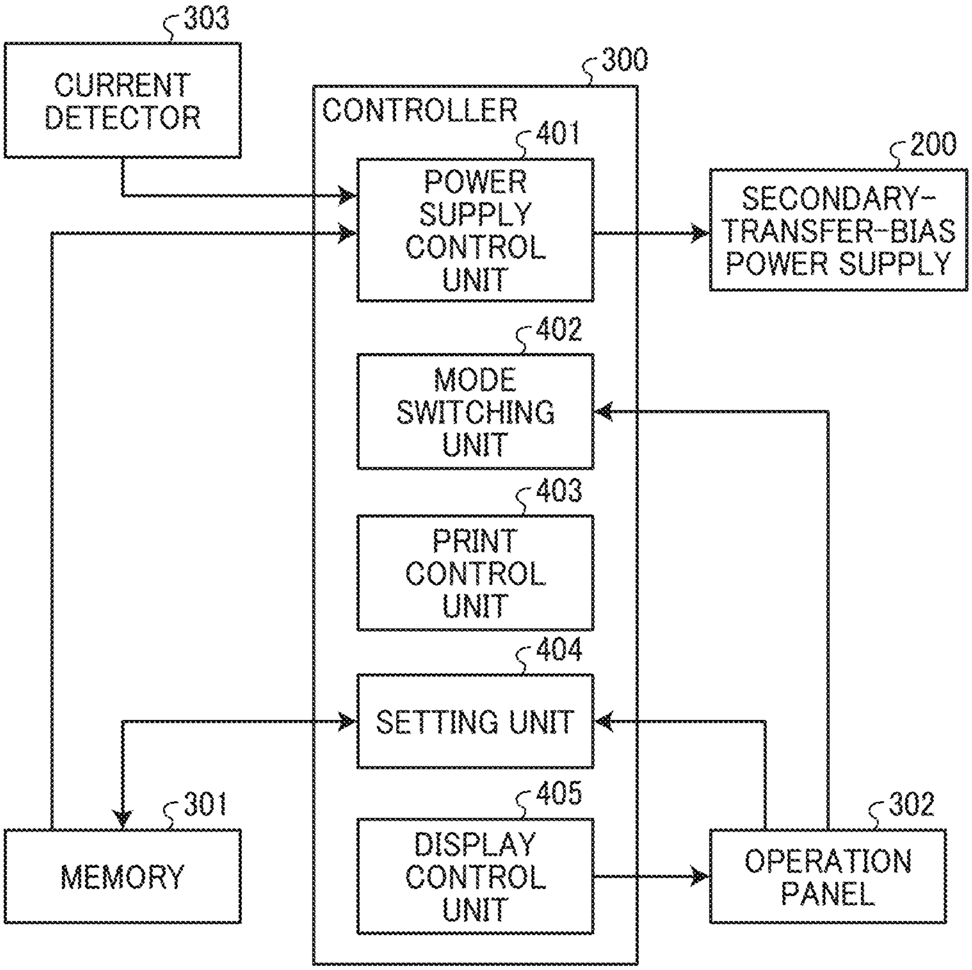
FIG. 4 is a diagram illustrating an example of a configuration of functional blocks of a controller of the image forming apparatus according to the embodiment.

Configuration and Operation of Functional Blocks of Controller of Image Forming Apparatus FIG. 4 is a diagram illustrating an example of a configuration of functional blocks of a controller of the image forming apparatus according to the embodiment. FIG. 5 is a diagram illustrating an example of the secondary transfer bias table of the image forming apparatus according to the embodiment. With reference to FIGS. 4 and 5, a description will be given of the configuration and operation of the functional blocks of the controller 300 of the image forming apparatus 1 according to the present embodiment.

As illustrated in FIG. 4, the controller 300 includes a power supply control unit 401 (first control unit), a mode switching unit 402, a print control unit 403 (second control unit), a setting unit 404, and a display control unit 405.

The power supply control unit 401 is a functional unit that controls operation of applying the secondary transfer bias to the secondary transfer nip by the secondary-transfer-bias power supply 200. Specifically, the power supply control unit 401 controls the secondary transfer bias applied from the secondary-transfer-bias power supply 200 to the secondary transfer counter roller 53. At the time of a print job for forming a desired image on a recording sheet, the power supply control unit 401 reads information on a type of a recording sheet set in the sheet-feeding cassette 100 from the memory 301. Further, the power supply control unit 401 determines whether image data to be printed is a monochrome image or a full-color image. Then, the power supply control unit 401 reads a corresponding secondary transfer bias from the secondary transfer bias table illustrated in FIG. 5 stored in the memory 301 on the basis of the read information on the type of the recording sheet and information on whether the image data to be printed is a monochrome image or a color image.

The power supply control unit 401 adjusts the secondary transfer bias output from the AC power supply 202 on the basis of the current value detected by the current detector 303 during printing. Specifically, for example, in a case where a target recording sheet is an uneven paper sheet or the like and thus a superimposed bias is applied as the secondary transfer bias, the power supply control unit 401 first acquires the current value detected by the current detector 303. Then, the power supply control unit 401 calculates a DC current value and an AC current value (peak-to-peak current) to be applied to the secondary transfer counter roller 53 on the basis of the current value detected by the current detector 303. Then, the power supply control unit 401 adjusts the DC component of the superimposed bias output from the secondary-transfer-bias power supply 200 by PWM constant current control so that the calculated DC current value is a DC current value of a superimposed bias corresponding to a current recording sheet set by the setting unit 404 in the secondary transfer bias table stored in the memory 301.

In addition, an AC voltage output from the AC power supply 202 and an AC voltage actually applied to the secondary transfer nip are different from each other depending on an electric resistance value of the secondary transfer counter roller 53 and an electric resistance value of the secondary transfer roller 56. For that reason, the power supply control unit 401 calculates an actual AC voltage value (peak-to-peak voltage) applied to the secondary transfer nip on the basis of the calculated AC current value. Then, the power supply control unit 401 adjusts the AC component of the superimposed bias output from the secondary-transfer-bias power supply 200 by PWM constant voltage control so that the calculated AC voltage value is an AC voltage value of the superimposed bias corresponding to the current recording sheet set by the setting unit 404 in the secondary transfer bias table stored in the memory 301.

As described above, when the toner image is secondarily transferred to the uneven paper sheet or the like, a sufficient amount of toner can be transferred to concaves of an uneven surface of the uneven paper sheet by applying the superimposed bias obtained by superimposing the AC component on the DC component to the secondary transfer counter roller 53. As a result, it is possible to suppress generation of a grayscale pattern following unevenness of the surface.

In addition, for example, in a case where a target recording sheet is a plain paper sheet or the like and thus a DC bias is applied as the secondary transfer bias, the power supply control unit 401 similarly acquires a current value detected by the current detector 303. Then, the power supply control unit 401 calculates a DC current value to be applied to the secondary transfer counter roller 53 on the basis of the current value detected by the current detector 303. Then, the power supply control unit 401 adjusts the DC bias output from the secondary-transfer-bias power supply 200 by PWM constant current control so that the calculated DC current value is a DC current value of a DC bias corresponding to the current recording sheet set by the setting unit 404 in the secondary transfer bias table stored in the memory 301.

As described above, when the toner image is secondarily transferred to the plain paper sheet or the like, the AC component that causes transfer dust is eliminated and the secondary transfer bias of only the DC component is used, whereby generation of the transfer dust can be suppressed.

The mode switching unit 402 is a functional unit that switches operation modes of the image forming apparatus 1 according to operation on the operation panel 302. The operation modes include a normal mode in which the secondary transfer bias of the secondary transfer bias table illustrated in FIG. 5 stored in the memory 301 is applied to the secondary transfer counter roller 53 to perform normal printing operation, and an adjustment mode in which an adjustment chart is printed on a target recording sheet to determine an optimum secondary transfer bias of the recording sheet to update the secondary transfer bias table. The adjustment mode includes a simple adjustment mode in which the adjustment chart is printed on both sides while the secondary transfer bias is changed in the same page of the recording sheet, and a detailed adjustment mode in which the adjustment chart is printed on both sides while the secondary transfer bias is changed for each page without a change of the secondary transfer bias in the same page of the recording sheet. Note that details of operation in the adjustment mode will be described later.

The simple adjustment mode corresponds to a "first adjustment mode" of the present embodiment, and the detailed adjustment mode corresponds to a "second adjustment mode" of the present embodiment.

The print control unit 403 is a functional unit that controls operation of the image forming unit 10, the optical writing unit 80, the transfer unit 50, and the like in order to print an image on a recording sheet.

The setting unit 404 is a functional unit that sets various types of setting information according to operation on the operation panel 302. For example, the user selects the type of the recording sheet set in the sheet-feeding cassette 100 via the operation panel 302, and the setting unit 404 sets the selected type of the recording sheet and stores the type in the memory 301. For example, as described later, in the adjustment mode, the setting unit 404 sets a secondary transfer condition of a number of an optimum adjustment chart selected and input by the user among adjustment charts printed under a plurality of secondary transfer conditions different from each other as a new secondary transfer bias for the recording sheet, and updates the secondary transfer bias table stored in the memory 301. The secondary transfer conditions correspond to "transfer conditions" of the present embodiment.

In the adjustment mode, the user is not limited to selecting and inputting the number of the optimum secondary transfer condition on the basis of the adjustment chart printed under the plurality of secondary transfer conditions different from each other, and it is sufficient that the user selects and inputs other identification information for identifying the secondary transfer condition. In this case, in order to enable identification of the adjustment chart transferred to the recording sheet under which secondary transfer condition, it is sufficient that the print control unit 403 transfers the identification information to the vicinity of a corresponding adjustment chart.

Optimum values of the AC component and the DC component of the secondary transfer bias may shift depending on deterioration of toner, a change in electric resistance of a member forming the secondary transfer nip such as the intermediate transfer belt 51 and the secondary transfer roller 56, an environment, and the like. For that reason, as described above, the image forming apparatus 1 can perform the adjustment mode, and change the secondary transfer bias to an optimum DC current value or a combination of the optimum DC current value and an AC voltage value.

Here, an example of the secondary transfer bias table stored in the memory 301 is illustrated in FIG. 5. As illustrated in FIG. 5, in a case where the type of the recording sheet is the plain paper sheet, the DC bias is stored as the secondary transfer bias in the secondary transfer bias table. In the present embodiment, as described above, since the DC power supply 201 is subjected to the constant current control by the power supply control unit 401, the DC current value is stored as the DC bias. In the case of a recording sheet having unevenness on the surface of embossed sheet or the like (hereinafter, may be referred to as an uneven paper sheet), the superimposed bias is stored as the secondary transfer bias in the secondary transfer bias table. In the present embodiment, as described above, since the DC power supply 201 is subjected to the constant current control by the power supply control unit 401, and the AC power supply 202 is subjected to the constant voltage control by the power supply control unit 401, the DC current value and the AC voltage value (peak-to-peak voltage value) are stored as the superimposed bias.

Electric resistance values of the toner image, thicknesses of the toner image, and the like are different from each other between a case where the full-color toner image is transferred to the recording sheet and a case where the monochrome toner image is transferred to the recording sheet. For that reason, optimum secondary transfer conditions are different from each other between a case where the full-color toner image is secondarily transferred to the recording sheet and a case where the monochrome toner image is secondarily transferred to the recording sheet. Furthermore, the recording sheet to which the toner image has been transferred is heated by the fixing device 90, and contained moisture evaporates, so that electric resistances of the recording sheet may be different from each other between a case where the toner image is transferred to the front surface of the recording sheet and a case where the toner image is transferred to the back surface of the recording sheet. For that reason, optimum secondary transfer conditions are different from each other between a case where the toner image is transferred to the front surface of the recording sheet and a case where the toner image is transferred to the back surface of the recording sheet.

Thus, in the present embodiment, as illustrated in FIG. 5, four secondary transfer biases are stored in association with one type of the recording sheet. Specifically, as illustrated in FIG. 5, the secondary transfer bias table stores, in association with the recording sheet, a secondary transfer bias used when the monochrome toner image is secondarily transferred to the front surface of the recording sheet, a secondary transfer bias used when the monochrome toner image is secondarily transferred to the back surface of the recording sheet, a secondary transfer bias used when the full-color toner image is secondarily transferred to the front surface of the recording sheet, and a secondary transfer bias used when the full-color toner image is secondarily transferred to the back surface of the recording sheet.

As described above, in the present embodiment, in the secondary transfer bias table, the secondary transfer bias is set for all combinations of monochrome/full-color and the front surface/back surface of the recording sheet having optimum secondary transfer conditions different from each other. As a result, a good image can be obtained in all combinations of monochrome/full-color and the front surface/back surface of the recording sheet.

In an initial use state of the image forming apparatus 1, default secondary transfer biases are associated with recording sheets, and the secondary transfer biases stored in association with the respective recording sheets are rewritten to secondary transfer biases determined by the adjustment mode to be described later. As illustrated in FIG. 5, the secondary transfer bias table of the memory 301 also stores information indicating the type (for example, plain paper sheet, uneven paper sheet, and the like) of the recording sheet set in the sheet-feeding cassette 100.

The display control unit 405 is a functional unit that controls display operation of the operation panel 302. The display control unit 405 displays, on the operation panel 302, for example, a screen for selecting the type of the recording sheet set in the sheet-feeding cassette 100, a screen for inputting the number of the optimum adjustment chart in the adjustment mode (for example, a screen illustrated in FIG. 11 to be described later), and the like.

The power supply control unit 401, the mode switching unit 402, the print control unit 403, the setting unit 404, and the display control unit 405 described above are implemented, for example, by executing a program by the CPU of the controller 300 illustrated in FIG. 3. At least a part of the power supply control unit 401, the mode switching unit 402, the print control unit 403, the setting unit 404, and the display control unit 405 may be implemented by a hardware circuit such as a field-programmable gate array (FPGA) or an application specific integrated circuit (ASIC).

Note that the functional units of the controller 300 illustrated in FIG. 4 conceptually illustrate functions, and the configuration of the controller is not limited to such a configuration. That is, the functional units of the controller 300 do not have to be configured as clear software modules as blocks illustrated in FIG. 4, and it is sufficient that the functions of the functional units are implemented as a whole by executing a program by the CPU of the controller 300. For example, the plurality of functional units illustrated as independent functional units in the controller 300 illustrated in FIG. 4 may be configured as one functional unit. On the other hand, a function of one functional unit in the controller 300 illustrated in FIG. 4 may be divided into a plurality of parts and configured as a plurality of functional units.

Operation in Adjustment Mode

Figure 7:
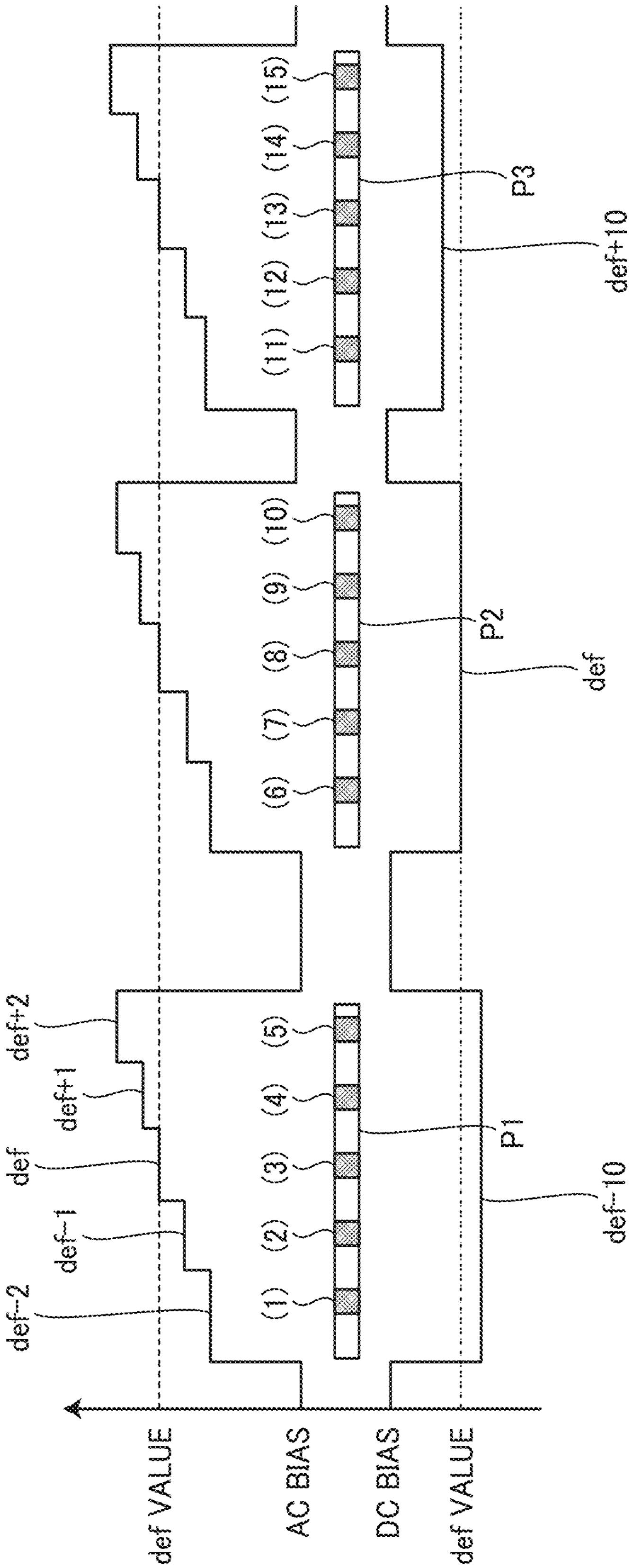
FIG. 7 is a timing chart illustrating an example of secondary transfer bias switching operation in a simple adjustment mode of the image forming apparatus according to the embodiment.
Figure 8B:
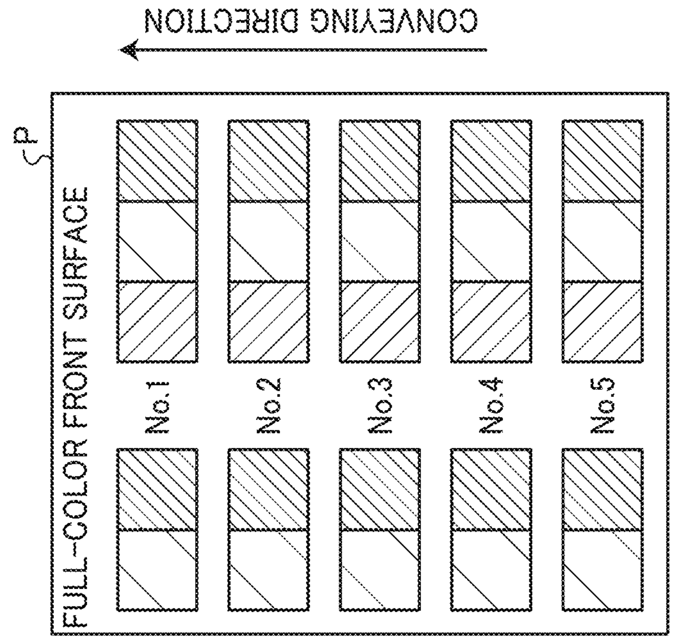
FIGS. 8A and 8B are diagrams illustrating examples of adjustment charts in the simple adjustment mode of the image forming apparatus according to the embodiment.
Figure 8A:
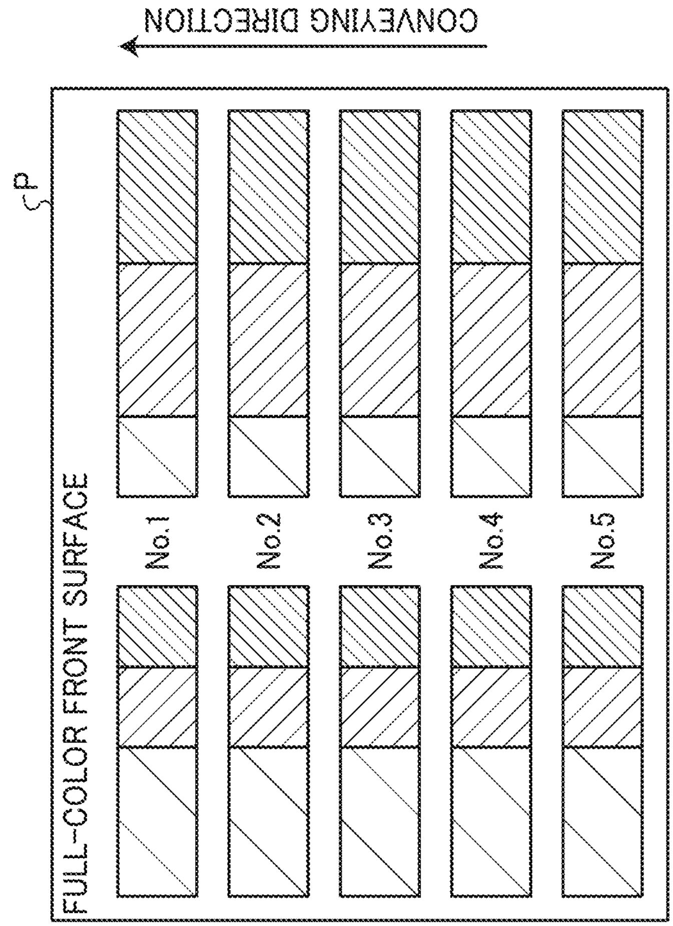
Figure 9B:
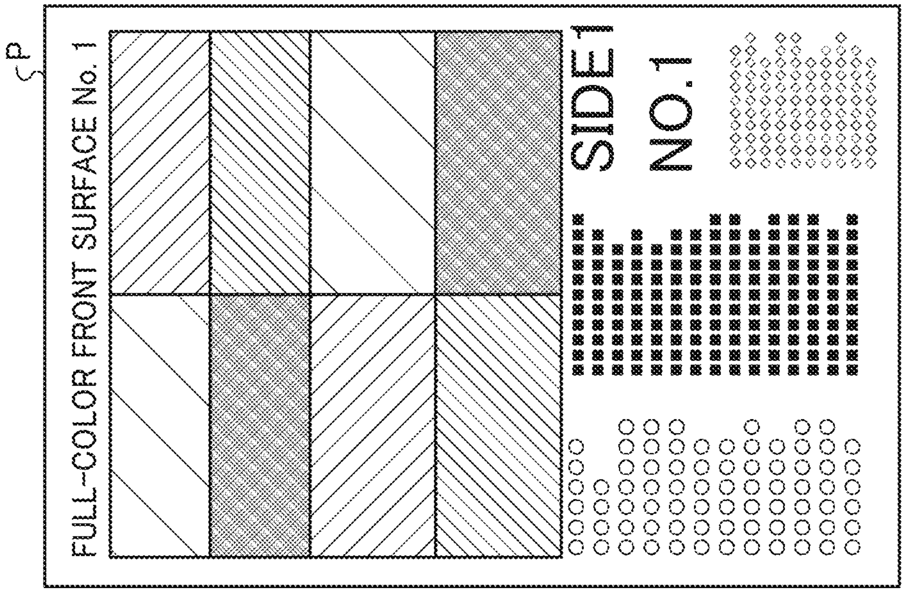
FIGS. 9A and 9B are diagrams illustrating examples of the adjustment chart in a detailed adjustment mode of the image forming apparatus according to the embodiment.
Figure 9A:
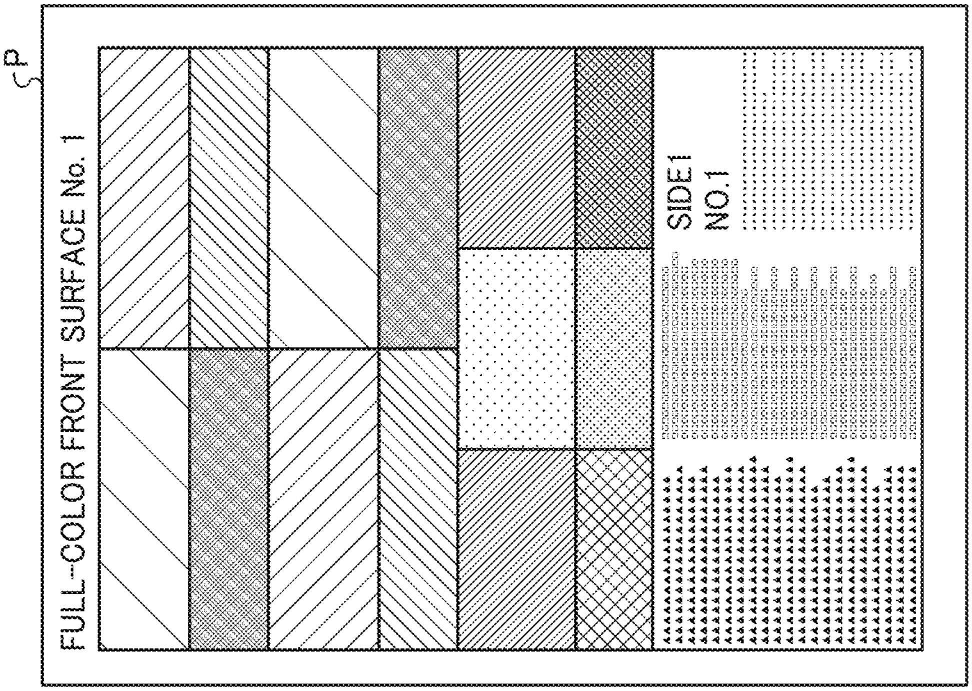

FIGS. 6A and 6B are diagrams illustrating examples of the secondary transfer conditions of the image forming apparatus according to the embodiment. FIG. 7 is a timing chart illustrating an example of secondary transfer bias switching operation in the simple adjustment mode of the image forming apparatus according to the embodiment. FIGS. 8A and 8B are diagrams illustrating examples of the adjustment charts in the simple adjustment mode of the image forming apparatus according to the embodiment. FIGS. 9A and 9B are diagrams illustrating examples of the adjustment chart in the detailed adjustment mode of the image forming apparatus according to the embodiment. With reference to FIGS. 6A to 9B, a description will be given of details of the operation in the adjustment mode of the image forming apparatus 1 according to the present embodiment.

First, the controller 300 starts operation in the adjustment mode for the secondary transfer bias. For example, the controller 300 starts the operation in the adjustment mode in response to operation on the operation panel 302 by the user. In this case, the user selects either the simple adjustment mode or the detailed adjustment mode among the adjustment modes.

Note that the controller 300 may start the operation in the adjustment mode when the user inputs information on the type of the recording sheet set in the sheet-feeding cassette 100 from the screen displayed on the operation panel 302 and the setting unit 404 sets the information on the recording sheet. In addition, a screen inquiring whether or not to execute the adjustment mode may be displayed on the operation panel 302 by the user inputting information on the type of the recording sheet set in the sheet-feeding cassette 100 from the screen displayed on the operation panel 302. Then, in a case where the user selects execution of the adjustment mode on the screen, the controller 300 may start the operation in the adjustment mode. On the other hand, in a case where the user does not select the execution of the adjustment mode on the screen, it is sufficient that the controller 300 uses a secondary transfer bias corresponding to the recording sheet in the secondary transfer bias table stored in the memory 301.

In addition, the display control unit 405 may display, on the operation panel 302, a display for prompting execution of the operation in the adjustment mode at a timing at which there is a possibility that an optimum value of the secondary transfer bias changes, such as when the power of the image forming apparatus 1 is turned on, every time a predetermined number of sheets are printed, or a case where a predetermined amount of environmental change (for example, the amount of change in temperature and humidity) is detected.

When the operation in the adjustment mode is started, the power supply control unit 401 reads a secondary transfer bias corresponding to a recording sheet to which the adjustment chart is to be transferred from the secondary transfer bias table of the memory 301. Next, the power supply control unit 401 changes the secondary transfer bias within a predetermined range with the read secondary transfer bias as a reference, and transfers adjustment charts to the recording sheet under secondary transfer conditions different from each other. That is, the power supply control unit 401 transfers the adjustment chart to the recording sheet for each of generated secondary transfer conditions. Here, the adjustment charts are chart images of an image, a character, or the like for selecting an optimum secondary transfer condition, which are printed (transferred) on the recording sheet under the secondary transfer conditions different from each other as described above.

Here, FIG. 6A illustrates an example of secondary transfer conditions different from each other when the adjustment chart is secondarily transferred to the uneven paper sheet by applying a superimposed bias to the secondary transfer counter roller 53. As illustrated in FIG. 6A, the power supply control unit 401 changes a DC current of the superimposed bias within a range of ±10 [μA] with respect to a reference DC current value (DC current value of a target secondary transfer bias set in the secondary transfer bias table at that time). Specifically, the power supply control unit 401 changes the DC current to three DC current values of the reference DC current value (def), a DC current value (def+10) of +10 [μA] with respect to the reference DC current value, and a DC current value (def−10) of −10 [μA] with respect to the reference DC set value, to apply the superimposed bias to the secondary transfer counter roller 53. Then, the print control unit 403 secondarily transfers the adjustment chart to the recording sheet while the superimposed biases are changed by the power supply control unit 401 and applied to the secondary transfer counter roller 53. In the above example, an amount of change in the DC current value is 10 [μA], and the range to be changed is +10 [μA]; however, the amount of change in the DC current value and the range to be changed may be freely set by the setting unit 404 according to operation on the operation panel 302 by the user.

On the other hand, the power supply control unit 401 changes an AC voltage (peak-to-peak voltage Vpp) of the superimposed bias within a range of ±2.0 [kV] with respect to a reference AC voltage value (AC voltage value of a target secondary transfer bias set in the secondary transfer bias table at that time). Specifically, the power supply control unit 401 changes the AC voltage to five AC voltage values of the reference AC voltage value (def), an AC voltage value (def+1) of +1.0 [kV] with respect to the reference AC voltage value, an AC voltage value (def−1) of −1.0 [kV]

with respect to the reference AC voltage value, an AC voltage value (def−2) of −2.0 [kV] with respect to the reference AC voltage value, and an AC voltage value (def+2) of +2.0 [kV] with respect to the reference AC voltage value, to apply the superimposed bias to the secondary transfer counter roller 53. Then, the print control unit 403 secondarily transfers the adjustment chart to the recording sheet while the superimposed biases are changed by the power supply control unit 401 and applied to the secondary transfer counter roller 53. In the above example, an amount of change in the AC voltage value is 1.0 [kV], and the range to be changed is ±2.0 [kV]; however, the amount of change in the AC voltage value and the range to be changed may be freely set by the setting unit 404 according to operation on the operation panel 302 by the user.

That is, in a case where the secondary transfer bias (superimposed bias) corresponding to the uneven paper sheet is adjusted, the power supply control unit 401 changes both the DC current and the AC voltage, and transfers the adjustment chart to the recording sheet that is the uneven paper sheet under 15 secondary transfer conditions illustrated in FIG. 6A. For that reason, in a case where the secondary transfer bias (superimposed bias) corresponding to the uneven paper sheet is adjusted, a total of 15 adjustment charts are formed. Numbers illustrated in FIG. 6A are numbers of adjustment charts transferred under the secondary transfer conditions different from each other corresponding to the uneven paper sheet. For example, the secondary transfer condition of the first adjustment chart formed first corresponds to "(1)" in FIG. 6A, and is a secondary transfer condition of a combination of the DC current value (def−10) of −10 [μA] with respect to the DC current value of the secondary transfer bias as a reference and the AC voltage value (def−2) of −2 [kV] with respect to the AC voltage value of the secondary transfer bias as a reference.

Next, FIG. 7 illustrates a timing chart illustrating changes in the AC voltage (AC bias in the figure) and the DC current (DC bias in the figure) in the simple adjustment mode in a case where the secondary transfer bias corresponding to the uneven paper sheet is adjusted. FIG. 7 illustrates an example in which a total of 15 adjustment charts to be transferred to the uneven paper sheet under the secondary transfer conditions different from each other are transferred to a total of 3 recording sheets. As illustrated in FIG. 7, for example, five adjustment charts are formed on one recording sheet. The first to fifth adjustment charts are transferred to a first recording sheet P1, the sixth to tenth adjustment charts are transferred to a second recording sheet P2, and the eleventh to fifteenth adjustment charts are transferred to a third recording sheet P3. That is, as illustrated in FIG. 7, the power supply control unit 401 changes the DC current of the secondary transfer bias for each recording sheet, changes the AC voltage of the secondary transfer bias to five voltages in each recording sheet, and transfers the adjustment charts to the recording sheets P1 to P3 under the 15 secondary transfer conditions illustrated in FIG. 6A. A manner of changing the DC current and the AC voltage of the secondary transfer bias is not limited to the timing chart illustrated in FIG. 7.

FIGS. 8A and 8B illustrate examples of the adjustment charts transferred to the recording sheet P1 in order to adjust the secondary transfer bias to be used when the full-color toner image is transferred to the front surface of the uneven paper sheet in the simple adjustment mode. In the present embodiment, as illustrated in FIGS. 8A and 8B, the print control unit 403 changes the adjustment charts to be transferred according to the size of the recording sheet. For example, the adjustment charts illustrated in FIG. 8A are for a case where the size of the recording sheet is large, and the adjustment charts illustrated in FIG. 8B are for a case where the size of the recording sheet is small. As illustrated in FIGS. 8A and 8B, the print control unit 403 changes the lengths in a main scanning direction and a sub-scanning direction of the adjustment charts according to the size of the recording sheet, and performs transfer such that the adjustment charts are arranged up to the vicinity of the end of the recording sheet. In addition, in order to enable identification of the adjustment chart transferred to the recording sheet under which secondary transfer condition, the print control unit 403 transfers a number indicating one of the 15 secondary transfer conditions described above to the vicinity of a corresponding adjustment chart.

In the present embodiment, first, the power supply control unit 401 reads the superimposed bias (DC current value, AC voltage value) of the monochrome front surface associated with the uneven paper sheet from the secondary transfer bias table of the memory 301. Then, the print control unit 403 transfers the first to fifth monochrome adjustment charts to the front surface of the recording sheet that is the first uneven paper sheet with the superimposed bias (DC current value, AC voltage value) read by the power supply control unit 401 as a reference. At this time, the print control unit 403 transfers "monochrome front surface" to the front surface of the recording sheet as an item of the secondary transfer bias to be adjusted. Then, the recording sheet that is the uneven paper sheet is reversed by the reverse reconveying device 105, and is conveyed again to the secondary transfer nip. Then, the power supply control unit 401 reads the superimposed bias (DC current value, AC voltage value) of the monochrome back surface associated with the uneven paper sheet from the secondary transfer bias table of the memory 301. Then, the print control unit 403 transfers the first to fifth monochrome adjustment charts to the back surface of the recording sheet that is the first uneven paper sheet with the superimposed bias (DC current value, AC voltage value) read by the power supply control unit 401 as a reference. At this time, the print control unit 403 transfers "monochrome back surface" to the back surface of the recording sheet as an item of the secondary transfer bias to be adjusted.

Next, the recording sheet that is the second uneven paper sheet is conveyed, and the print control unit 403 transfers the sixth to tenth monochrome adjustment charts to the front surface of the recording sheet that is the second uneven paper sheet with the superimposed bias (DC current value, AC voltage value) read by the power supply control unit 401 as a reference. At this time, the print control unit 403 transfers "monochrome front surface" to the front surface of the recording sheet as an item of the secondary transfer bias to be adjusted. Similarly, the print control unit 403 transfers the sixth to tenth monochrome adjustment charts to the back surface of the recording sheet that is the second uneven paper sheet with the superimposed bias (DC current value, AC voltage value) read by the power supply control unit 401 as a reference. At this time, the print control unit 403 transfers "monochrome back surface" to the back surface of the recording sheet as an item of the secondary transfer bias to be adjusted. Similarly, the print control unit 403 transfers the eleventh to fifteenth monochrome adjustment charts to the front surface and the back surface of the recording sheet that is the third uneven paper sheet.

Next, the power supply control unit 401 reads the superimposed bias (DC current value, AC voltage value) of the full-color front surface associated with the uneven paper sheet from the secondary transfer bias table of the memory 301. Then, the print control unit 403 transfers the first to fifth full-color adjustment charts to the front surface of the recording sheet that is the fourth uneven paper sheet with the superimposed bias (DC current value, AC voltage value) read by the power supply control unit 401 as a reference. At this time, the print control unit 403 transfers "full-color front surface" to the front surface of the recording sheet as an item of the secondary transfer bias to be adjusted. Then, the recording sheet that is the uneven paper sheet is reversed by the reverse re-conveying device 105, and is conveyed again to the secondary transfer nip. Then, the power supply control unit 401 reads the superimposed bias (DC current value, AC voltage value) of the full-color back surface associated with the uneven paper sheet from the secondary transfer bias table of the memory 301. Then, the print control unit 403 transfers the first to fifth full-color adjustment charts to the back surface of the recording sheet that is the fourth uneven paper sheet with the superimposed bias (DC current value, AC voltage value) read by the power supply control unit 401 as a reference. At this time, the print control unit 403 transfers "full-color back surface" to the back surface of the recording sheet as an item of the secondary transfer bias to be adjusted.

Similarly, the print control unit 403 transfers the sixth to tenth full-color adjustment charts to each of the front surface and the back surface of the recording sheet that is the fifth uneven paper sheet, and transfers the eleventh to fifteenth full-color adjustment charts to each of the front surface and the back surface of the recording sheet that is the sixth uneven paper sheet.

In the above example, the transfer of the full-color adjustment charts is performed after the transfer of the monochrome adjustment charts, but the present disclosure is not limited thereto, and the transfer of the monochrome adjustment charts may be performed after the transfer of the full-color adjustment charts.

As described above, in the simple adjustment mode, since the adjustment charts are transferred by switching the plurality of secondary transfer conditions in the same recording sheet, it is possible to suppress the number of recording sheets necessary for adjustment of the secondary transfer bias.

On the other hand, in a case where the secondary transfer bias corresponding to the uneven paper sheet is adjusted in the detailed adjustment mode, the power supply control unit 401 switches the 15 secondary transfer conditions for respective recording sheets, and the print control unit 403 transfers the adjustment charts under the secondary transfer conditions switched for the respective recording sheets by the power supply control unit 401. In this case, 15 recording sheets are required, in which 15 is the number of secondary transfer conditions.

FIGS. 9A and 9B illustrate examples of the adjustment chart transferred to the recording sheet P in order to adjust the secondary transfer bias to be used when the full-color toner image is transferred to the front surface of the uneven paper sheet in the detailed adjustment mode. An example is illustrated in which the adjustment chart is transferred under the first secondary transfer condition on the recording sheet P illustrated in FIGS. 9A and 9B. For example, the adjustment chart illustrated in FIG. 9A is for a case where the size of the recording sheet is large, and the adjustment chart illustrated in FIG. 9B is for a case where the size of the recording sheet is small. As illustrated in FIGS. 9A and 9B, the print control unit 403 changes the lengths in a main scanning direction and a sub-scanning direction of the adjustment chart according to the size of the recording sheet, and performs transfer such that the adjustment chart is arranged up to the vicinity of the end of the recording sheet. In addition, in order to enable identification of the adjustment chart transferred to the recording sheet under which secondary transfer condition, the print control unit 403 transfers a number indicating one of the 15 secondary transfer conditions described above. As illustrated in FIGS. 9A and 9B, in the detailed adjustment mode, since the adjustment chart is transferred to the same recording sheet under the same secondary transfer condition, it is possible to transfer large-sized adjustment patches covering the entire main scanning direction, multi-colored adjustment patches and character strings in the page, and the like, and there is an advantage that it is possible to increase determination information when the user selects a preferable secondary transfer condition. On the other hand, since the number of recording sheets necessary for adjustment of the secondary transfer bias increases, in a case where there is little determination information and there is no disadvantage, the secondary transfer bias can be adjusted with a small number of recording sheets by using the simple adjustment mode.

FIG. 6B illustrates an example of secondary transfer conditions different from each other when the adjustment chart is secondarily transferred to the plain paper sheet by applying a DC bias to the secondary transfer counter roller 53. As illustrated in FIG. 6B, the power supply control unit 401 changes the DC bias in a range of −2 [μA] to +6 [μA] with respect to the reference DC current value (DC current value of the target secondary transfer bias set in the secondary transfer bias table at that time). Specifically, the power supply control unit 401 changes the DC current to nine DC current values of the reference DC current value (def), a DC current value (def−2) of −2 [μA] with respect to the reference DC current value, a DC current value (def−1) of −1 [μA] with respect to the reference DC current value, a DC current value (def+1) of +1 [μA] with respect to the reference DC current value, a DC current value (def+2) of +2 [μA] with respect to the reference DC current value, a DC current value (def+3) of +3 [μA] with respect to the reference DC current value, a DC current value (def+4) of +4 [μA] with respect to the reference DC current value, a DC current value (def+5) of +5 [μA] with respect to the reference DC current value, and a DC current value (def+6) of +6 [μA] with respect to the reference DC current value, to apply the DC bias to the secondary transfer counter roller 53. Then, the print control unit 403 secondarily transfers the adjustment chart to the recording sheet while the DC biases are changed by the power supply control unit 401 and applied to the secondary transfer counter roller 53. In the above example, the amount of change in the DC current value is 1 [μA], and the range to be changed is −2 [μA] to +6 [μA]; however, the amount of change in the DC current value and the range to be changed may be freely set by the setting unit 404 according to operation on the operation panel 302 by the user.

That is, in a case where the secondary transfer bias (DC bias) corresponding to the plain paper sheet is adjusted, the power supply control unit 401 changes the DC current and transfers the adjustment chart to the recording sheet that is the plain paper sheet under the nine secondary transfer conditions illustrated in FIG. 6B. For that reason, in the case where the secondary transfer bias (DC bias) corresponding to the plain paper sheet is adjusted, a total of nine adjustment charts are formed. Numbers illustrated in FIG. 6B are numbers of adjustment charts transferred under the secondary transfer conditions different from each other corresponding to the plain paper sheet. For example, the secondary transfer condition of the first adjustment chart formed first corresponds to "(16)" in FIG. 6B, and is a secondary transfer condition of the DC current value (def−2) of −2 [μA] with respect to the DC current value of the secondary transfer bias as a reference.

Note that the operation in the simple adjustment mode for the recording sheet of the plain paper sheet is similar to the operation in the simple adjustment mode for the recording sheet of the uneven paper sheet described above. Further, the operation in the detailed adjustment mode for the recording sheet of the plain paper sheet is similar to the operation in the detailed adjustment mode for the recording sheet of the uneven paper sheet described above.

In addition, in the secondary transfer bias table illustrated in FIG. 5, an example has been described in which a DC bias is applied as a secondary transfer bias for the plain paper sheet and a superimposed bias is applied as a secondary transfer bias for the uneven paper sheet in the adjustment mode, but the present disclosure is not limited thereto. For example, in a case where a plurality of different secondary transfer conditions is created by the power supply control unit 401 in the adjustment mode for the plain paper sheet, a secondary transfer condition of a superimposed bias or a secondary transfer condition in which a DC bias and a superimposed bias are mixed may be created instead of a secondary transfer condition of a DC bias. Similarly, in a case where a plurality of different secondary transfer conditions is created by the power supply control unit 401 in the adjustment mode for the uneven paper sheet, a secondary transfer condition of a DC bias or a secondary transfer condition in which a DC bias and a superimposed bias are mixed may be created instead of a secondary transfer condition of a superimposed bias.

In addition, in a case where secondary transfer conditions different from each other are created by the power supply control unit 401 in the adjustment mode, the secondary transfer conditions are created with the target secondary transfer bias set in the secondary transfer bias table at that time as a reference; however, the present disclosure is not limited thereto, and the secondary transfer conditions may be created with a predetermined default secondary transfer bias as a reference.

In addition, in the present embodiment, the two adjustment modes of the simple adjustment mode and the detailed adjustment mode have been described as the adjustment modes, but the adjustment modes are not limited to two modes, and there may be three or more adjustment modes. For example, there may be a mixed adjustment mode or the like in which, for the secondary transfer biases corresponding to the four "monochrome front surface", "monochrome back surface", "full-color front surface", and "full color back surface" as illustrated in FIG. 5, operation is performed in the simple adjustment mode for some secondary transfer biases, and operation is performed in the detailed adjustment mode for the remaining secondary transfer biases.

Flow of Operation in Adjustment Mode of Image Forming Apparatus

Figure 10:
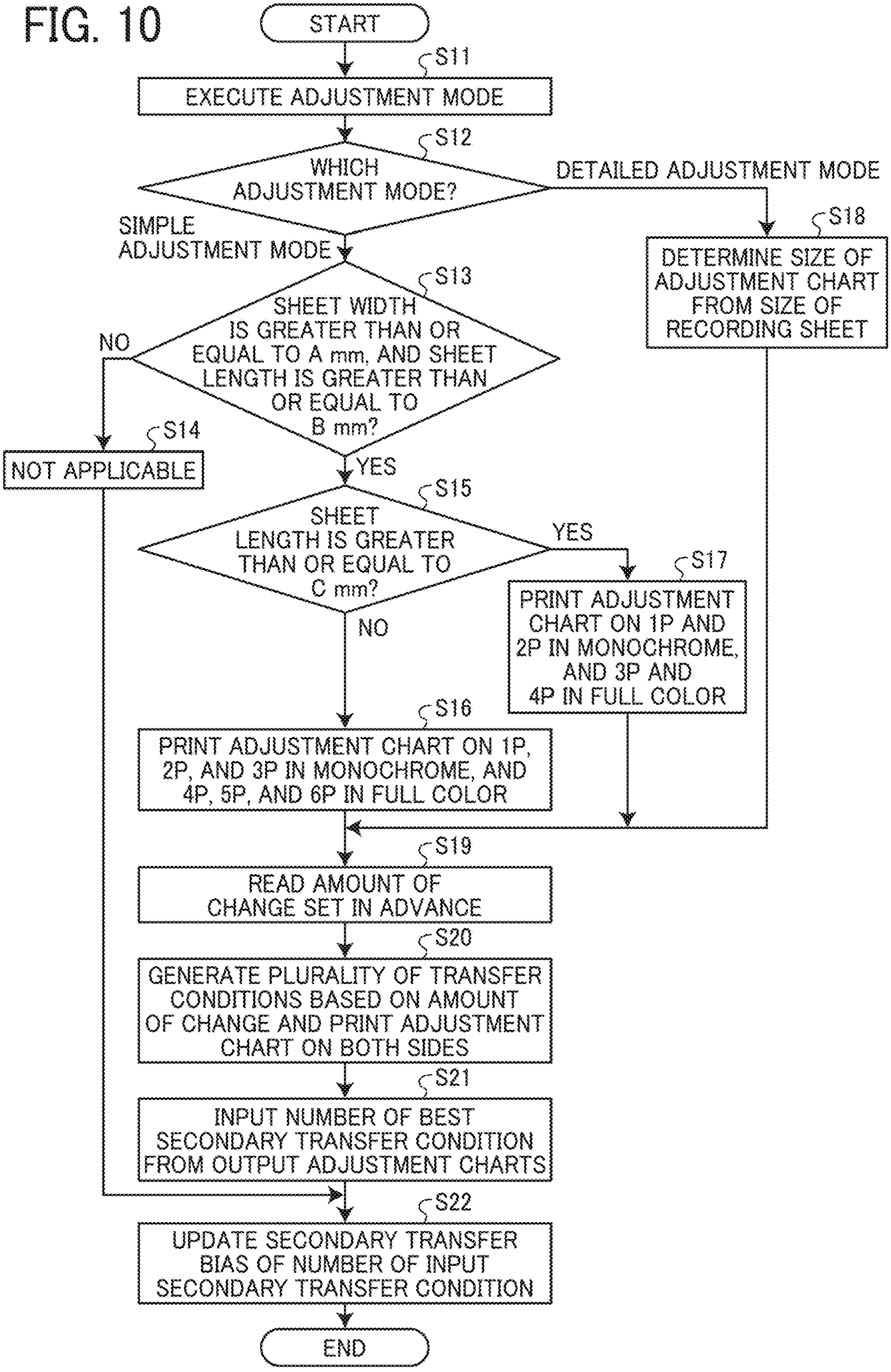
FIG. 10 is a flowchart illustrating an example of a flow of operation in the adjustment mode of the image forming apparatus according to the embodiment.
Figure 11:
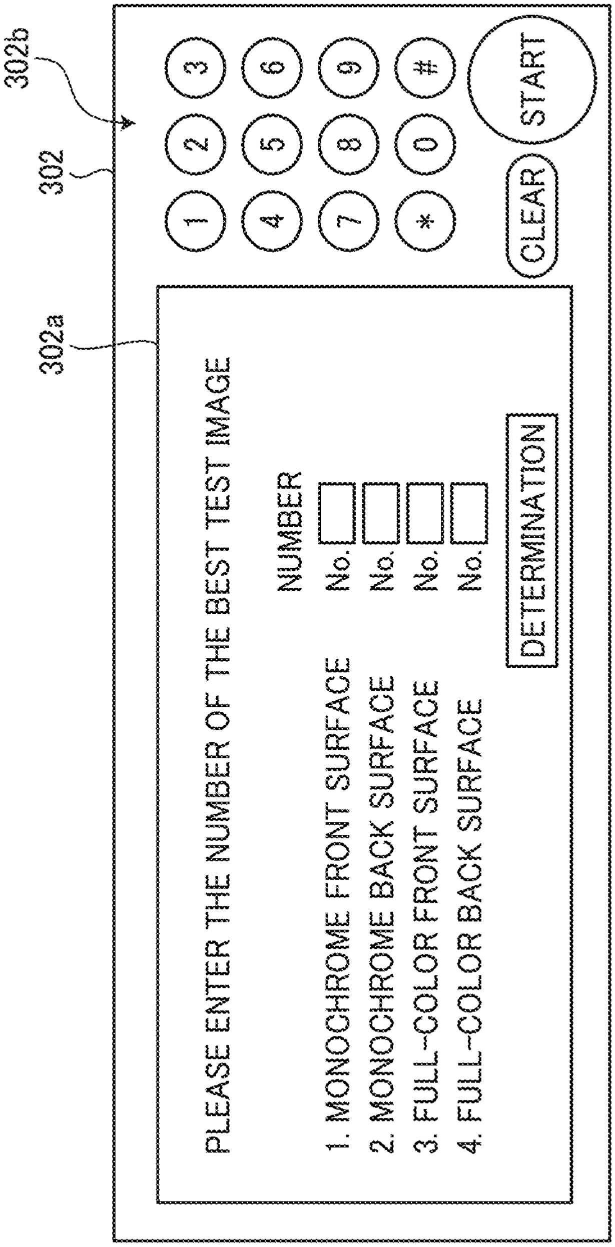
FIG. 11 is a diagram illustrating an example of a screen for inputting a number of the adjustment chart, displayed on an operation panel of the image forming apparatus according to the embodiment.

FIG. 10 is a flowchart illustrating an example of a flow of operation in the adjustment mode of the image forming apparatus according to the embodiment. FIG. 11 is a diagram illustrating an example of the screen for inputting the number of the adjustment chart, displayed on the operation panel of the image forming apparatus according to the embodiment. With reference to FIGS. 10 and 11, a description will be given of an example of a flow of operation in the adjustment mode of the image forming apparatus 1 according to the present embodiment.

Step S11

First, the controller 300 starts the operation in the adjustment mode for the secondary transfer bias. For example, the controller 300 starts the operation in the adjustment mode according to operation on the operation panel 302 by the user. In this case, the user selects either the simple adjustment mode or the detailed adjustment mode among the adjustment modes. Then, the process proceeds to step S12.

Step S12

In a case where the adjustment mode selected by the user is the simple adjustment mode (step S12: simple adjustment mode), the process proceeds to step S13, and in a case where the adjustment mode is the detailed adjustment mode (step S12: detailed adjustment mode), the process proceeds to step S18.

Step S13

The controller 300 executes the operation in the simple adjustment mode. The controller 300 determines whether or not the length in the main scanning direction (sheet width) is greater than or equal to a predetermined value A and the length in the sub-scanning direction (sheet length) is greater than or equal to a predetermined value B with respect to the size of the recording sheet set in advance by the setting unit 404. With respect to the size of the recording sheet, in a case where the length in the main scanning direction (sheet width) is greater than or equal to the predetermined value A and the length in the sub-scanning direction (sheet length) is greater than or equal to the predetermined value B (step S13: Yes), the process proceeds to step S15, and in a case where the length in the main scanning direction (sheet width) is less than the predetermined value A or the length in the sub-scanning direction (sheet length) is less than the predetermined value B (step S13: No), the process proceeds to step S14.

Step S14

With respect to the recording sheet, in a case where the length in the main scanning direction (sheet width) is less than the predetermined value A or the length in the sub-scanning direction (sheet length) is less than the predetermined value B, it is difficult to transfer the adjustment chart in the simple adjustment mode to the recording sheet, and thus, the controller 300 determines that the recording sheet is not applicable. Then, the process proceeds to step S22.

Step S15

Furthermore, the controller 300 determines whether or not the length in the sub-scanning direction (sheet length) is greater than or equal to a predetermined value C with respect to the size of the recording sheet set in advance by the setting unit 404. In a case where the length in the sub-scanning direction (sheet length) is greater than or equal to the predetermined value C with respect to the size of the recording sheet (step S15: Yes), the process proceeds to step S17, and in a case where the length is less than the predetermined value C (step S15: No), the process proceeds to step S16.

Step S16

In this case, since the recording sheet is small in size, the controller 300 determines that the monochrome adjustment chart is to be printed on both sides of pages 1 to 3 of the recording sheet, and the full-color adjustment chart is to be printed on both sides of pages 4 to 6. Then, the process proceeds to step S19.

Step S17

In this case, since the recording sheet is large in size, the controller 300 determines that the monochrome adjustment chart is to be printed on both sides of pages 1 and 2 of the recording sheet, and the full-color adjustment chart is to be printed on both sides of pages 3 and 4. Then, the process proceeds to step S19.

Step S18

The controller 300 executes the operation in the detailed adjustment mode. The controller 300 determines the size of the adjustment chart to be transferred to the recording sheet from the size of the recording sheet set in advance by the setting unit 404. Then, the process proceeds to step S19.

Step S19

The power supply control unit 401 refers to the memory 301 and reads a secondary transfer bias (superimposed bias or DC bias) corresponding to the type of the recording sheet set in advance by the setting unit 404 and an amount of change for generating secondary transfer conditions different from each other on the basis of the secondary transfer bias. Then, the process proceeds to step S20.

Step S20

The power supply control unit 401 changes the secondary transfer bias by the read amount of change within a predetermined range with the read secondary transfer bias as a reference, generates secondary transfer conditions different from each other, and applies the secondary transfer bias to the secondary transfer counter roller 53 while switching the secondary transfer conditions. The print control unit 403 prints the adjustment chart on both sides of the recording sheet while the secondary transfer biases are changed by the power supply control unit 401 and applied to the secondary transfer counter roller 53. Then, the process proceeds to step S21.

Step S21

The user inputs, to the operation panel 302, the number of the adjustment chart determined to be in the best printing state among the adjustment charts transferred to the recording sheet, that is, the number of the secondary transfer condition used for printing the adjustment chart. Here, FIG. 11 illustrates an example of a screen for inputting the number of the adjustment chart displayed on the operation panel 302. The operation panel 302 includes a touch panel 302*a* having an input function and a display function, and a key operation unit 302*b* that receives an operation input. In the example illustrated in FIG. 11, the touch panel 302*a* displays a screen on which it is enabled to input the best number for each of the adjustment charts of "monochrome front surface", "monochrome back surface", "full-color front surface", and "full-color back surface". In the example illustrated in FIG. 11, the user operates the key operation unit 302*b* to input each number. Then, the process proceeds to step S22.

Step S22

The setting unit 404 sets the secondary transfer condition of the number of the optimum adjustment chart input by the user among the adjustment charts printed under different secondary transfer conditions as a new secondary transfer bias for the recording sheet, and updates the secondary transfer bias table stored in the memory 301. Note that, in a case where it is not applicable in step S14, step S22 may be skipped. Then, the controller 300 ends the operation in the adjustment mode.

As described above, in the image forming apparatus 1 according to the present embodiment, the power supply control unit 401 generates a plurality of secondary transfer conditions different from each other for a combination including at least a DC component out of the DC component and an AC component with respect to a secondary transfer bias to be applied from the secondary-transfer-bias power supply 200 to the secondary transfer nip formed between the intermediate transfer belt 51 that bears the toner image and the secondary transfer roller 56, and switches the plurality of secondary transfer conditions to apply the secondary transfer bias from the secondary-transfer-bias power supply 200 to the transfer nip, and the print control unit 403 transfers an adjustment chart from the intermediate transfer belt 51 to a recording sheet for each secondary transfer condition to be applied by the power supply control unit 401 according to an adjustment mode that is set among a plurality of adjustment modes for adjusting a secondary transfer bias corresponding to the recording sheet. As a result, in the adjustment of the secondary transfer bias, it is possible to reduce a burden on the user, the time for the adjustment, and the waste sheets of the recording sheets caused by the adjustment.

In the above-described embodiment, in a case where at least one of the functional units of the controller 300 of the image forming apparatus 1 is implemented by execution of a program, the program is provided by being incorporated in advance in a read only memory (ROM) or the like. In the above-described embodiment, the program executed by the image forming apparatus 1 may be provided by being recorded in a computer-readable recording medium such as a compact disc read only memory (CD-ROM), a flexible disk (FD), a compact disk-recordable (CD-R), or a digital versatile disc (DVD) as a file in an installable format or an executable format. In the above-described embodiment, the program executed by the image forming apparatus 1 may be stored on a computer connected to a network such as the Internet and provided by being downloaded via the network. In the above-described embodiment, the program executed by the image forming apparatus 1 may be provided or distributed via a network such as the Internet. In the above-described embodiment, the program executed by the image forming apparatus 1 has a module configuration including at least one of the above-described functional units, and as actual hardware, the CPU reads and executes the program from the above-described storage device (for example, the memory 301), so that the above-described functional units are loaded and generated on a main storage device.

Aspects of the present disclosure are, for example, as follows.

First Aspect

According to a first aspect, an image forming apparatus includes: a first control unit to generate a plurality of transfer conditions for a transfer bias to be applied from a power supply device to a transfer nip between an image bearer to bear a toner image and a transfer member, the plurality of transfer conditions being different from each other and including a combination of values of at least a DC component out of the DC component and an AC component; and a second control unit to transfer an image from the image bearer to a recording material for each one of the plurality of transfer conditions to be applied by the first control unit according to an adjustment mode that is set among a plurality of adjustment modes for adjusting a transfer bias corresponding to the recording material.

Second Aspect

According to a second aspect, the image forming apparatus of the first aspect further includes a setting unit to set a transfer condition corresponding to identification information for identifying the transfer condition in a storage device as a new transfer bias corresponding to the recording material, the transfer condition being input from an operation device on the basis of the recording material to which the image is transferred.

Third Aspect

According to a third aspect, in the image forming apparatus of the first aspect or the second aspect, the plurality of adjustment modes includes: a first adjustment mode in which the first control unit switches the plurality of transfer conditions within each one of a plurality of recording materials to apply the transfer bias from the power supply device; and a second adjustment mode in which the first control unit switches the plurality of transfer conditions for each one of the plurality of recording materials to apply the transfer bias from the power supply device.

Fourth Aspect

According to a fourth aspect, the image forming apparatus of any one of the first aspect to the third aspect further includes a current detector that detects a current flowing through the transfer nip. The power supply device includes a DC power supply and an AC power supply. The first control unit performs constant current control on a DC component output from the DC power supply and performs constant voltage control on an AC component output from the AC power supply on the basis of the current detected by the current detector.

Fifth Aspect

According to a fifth aspect, in the image forming apparatus of any one of the first aspect to the fourth aspect, the first control unit applies a DC bias that applies only a DC component or a superimposed bias in which a DC component is superimposed on an AC component, as the transfer bias, according to the recording material.

Sixth Aspect

According to a sixth aspect, in the image forming apparatus of any one of the first aspect to the fifth aspect, the second control unit transfers an adjustment chart as the image to the recording material in the adjustment mode.

Seventh Aspect

According to a seventh aspect, in the image forming apparatus of the sixth aspect, the second control unit changes the adjustment chart to be transferred to the recording material according to the size of the recording material, in the adjustment mode.

Eighth Aspect

According to an eighth aspect, in the image forming apparatus of the second aspect, the setting unit sets an amount of change used to generate the plurality of transfer conditions by the first control unit, according to an input to the operation unit.

Ninth Aspect

According to a ninth aspect, an image forming method includes: a first control step of generating a plurality of transfer conditions for a transfer bias to be applied from a power supply device to a transfer nip between an image bearer to bear a toner image and a transfer member, the plurality of transfer conditions being different from each other and including a combination of values of at least a DC component out of the DC component and an AC component, and switching the plurality of transfer conditions to apply the transfer bias from the power supply device to the transfer nip; and a second control step of transferring an image from the image bearer to a recording material for each one of the plurality of transfer conditions to be applied, according to an adjustment mode that is set among a plurality of adjustment modes for adjusting a transfer bias corresponding to the recording material.

Tenth Aspect

According to a tenth aspect, a program causes a computer to execute: a first control step of generating a plurality of transfer conditions for a transfer bias to be applied from a power supply device to a transfer nip between an image bearer to bear a toner image and a transfer member, the plurality of transfer conditions being different from each other and including a combination of values of at least a DC component out of the DC component and an AC component, and switching the plurality of transfer conditions to apply the transfer bias from the power supply device to the transfer nip; and a second control step of transferring an image from the image bearer to a recording material for each one of the plurality of transfer conditions to be applied, according to an adjustment mode that is set among a plurality of adjustment modes for adjusting a transfer bias corresponding to the recording material.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image forming apparatus, comprising:

an image bearer configured to bear a toner image;

a transfer member opposite the image bearer and configured to form a transfer nip between the transfer member and the image bearer;

a power supply device configured to apply a transfer bias to the transfer nip; and processing circuitry configured to:

generate a plurality of transfer conditions for the transfer bias, the plurality of transfer conditions being different from each other and including a combination of values of at least a direct current (DC) component out of the DC component and an alternating current (AC) component, switch the plurality of transfer conditions to apply the transfer bias from the power supply device to the transfer nip; and transfer an image from the image bearer to a recording material for each one of the plurality of transfer conditions according to an adjustment mode that is set among a plurality of adjustment modes for adjusting the transfer bias corresponding to the recording material, wherein the plurality of adjustment modes include a first adjustment mode of switching the plurality of transfer conditions within each recording material of a plurality of recording material and a second adjustment mode of switching the plurality of transfer conditions for each recording material of the plurality of recording material.

2. The image forming apparatus according to claim 1, further comprising:

a memory; and an operation panel configured to input identification information for identifying a transfer condition on a basis of the recording material on which the image is transferred, wherein the processing circuitry is configured to set the transfer condition corresponding to the identification information that is input from the operation panel in the memory as a new transfer bias corresponding to the recording material.

3. The image forming apparatus according to claim 1, wherein in the first adjustment mode, the processing circuitry switches the plurality of transfer conditions within each recording material to apply the transfer bias from the power supply device, and in the second adjustment mode, the processing circuitry switches the plurality of transfer conditions for each recording material to apply the transfer bias from the power supply device.

4. The image forming apparatus according to claim 1, further comprising a current detector configured to detect a current flowing through the transfer nip, wherein the power supply device includes a DC power supply and an AC power supply, and the processing circuitry is configured to perform constant current control on the DC component that is output from the DC power supply and perform constant voltage control on the AC component that is output from the AC power supply on a basis of the current detected by the current detector.

5. The image forming apparatus according to claim 1, wherein the processing circuitry is configured to apply a DC bias that applies only the DC component or a superimposed bias in which the DC component is superimposed on the AC component, as the transfer bias, according to the recording material.

6. The image forming apparatus according to claim 1, wherein the processing circuitry is configured to transfer an adjustment chart as the image to the recording material in the adjustment mode.

7. The image forming apparatus according to claim 6, wherein the processing circuitry is configured to change the adjustment chart to be transferred to the recording material according to a size of the recording material, in the adjustment mode.

8. The image forming apparatus according to claim 2, wherein the processing circuitry is configured to set an amount of change used to generate the plurality of transfer conditions, according to an input to the operation panel.

9. An image forming method, comprising:

generating a plurality of transfer conditions for a transfer bias to be applied from a power supply device to a transfer nip between an image bearer to bear a toner image and a transfer member, the plurality of transfer conditions being different from each other and including a combination of values of at least a DC component out of the DC component and an AC component;

switching the plurality of transfer conditions to apply the transfer bias from the power supply device to the transfer nip; and transferring an image from the image bearer to a recording material for each one of the plurality of transfer conditions to be applied, according to an adjustment mode that is set among a plurality of adjustment modes for adjusting the transfer bias corresponding to the recording material, wherein the plurality of adjustment modes include a first adjustment mode of switching the plurality of transfer conditions within each recording material of a plurality of recording material and a second adjustment mode of switching the plurality of transfer conditions for each recording material of the plurality of recording material.

10. A non-transitory recording medium storing program code for causing a computer to execute:

generating a plurality of transfer conditions for a transfer bias to be applied from a power supply device to a transfer nip between an image bearer to bear a toner image and a transfer member, the plurality of transfer conditions being different from each other and including a combination of values of at least a DC component out of the DC component and an AC component;

switching the plurality of transfer conditions to apply the transfer bias from the power supply device to the transfer nip; and transferring an image from the image bearer to a recording material for each one of the plurality of transfer conditions to be applied, according to an adjustment mode that is set among a plurality of adjustment modes for adjusting the transfer bias corresponding to the recording material, wherein the plurality of adjustment modes include a first adjustment mode of switching the plurality of transfer conditions within each recording material of a plurality of recording material and a second adjustment mode of switching the plurality of transfer conditions for each recording material of the plurality of recording material.

* * * * *